United States Patent [19]

Edwards

[11] Patent Number: 4,584,515

[45] Date of Patent: Apr. 22, 1986

[54] RE-REGULATION CIRCUIT FOR AUTOMOBILE TACHOMETER DETECTION CIRCUIT

[75] Inventor: Arthur J. Edwards, Hoffman Estates, Ill.

[73] Assignee: Motorola, Inc., Schaumburg, Ill.

[21] Appl. No.: 687,604

[22] Filed: Dec. 31, 1984

[51] Int. Cl.⁴ .............................................. H02J 7/14
[52] U.S. Cl. .................................. 322/28; 307/10 R; 320/64; 322/7; 322/99
[58] Field of Search ....................... 322/28, 29, 99, 73, 322/7, 8, 94, 91; 320/61, 64, 6, 15, 13; 307/10 R, 16; 361/20

[56] References Cited

U.S. PATENT DOCUMENTS

| | | | |
|---|---|---|---|
| 4,128,799 | 12/1978 | Morishima | 320/64 X |
| 4,207,511 | 1/1980 | Radtke | 320/6 |
| 4,268,787 | 5/1981 | Sloan | 322/94 X |
| 4,314,193 | 2/1982 | Mortonson | 320/64 X |
| 4,323,837 | 4/1982 | Nakamura et al. | 322/7 |
| 4,360,773 | 11/1982 | Voss | 322/28 |
| 4,379,990 | 4/1983 | Sievers et al. | 322/99 |

FOREIGN PATENT DOCUMENTS

| | | | |
|---|---|---|---|
| 2542524 | 9/1984 | France | 322/28 |
| 0143027 | 11/1979 | Japan | 320/13 |

*Primary Examiner*—R. J. Hickey
*Attorney, Agent, or Firm*—Margaret Marsh Parker; James W. Gillman

[57] ABSTRACT

A re-regulation circuit operates in the environment of a vehicle alternator/charging system and cooperates with the standard regulator to prevent momentary loss of load from reducing the field excitation to such an extent that the alternator AC output is too low for proper functioning of such AC-dependent circuits as the tachometer circuit. Re-regulation is prohibited in the event of a true fault in the system. The temporary condition is not indicated to the user as a true fault.

9 Claims, 6 Drawing Figures

RE-REGULATION CIRCUIT FOR AUTOMOBILE TACHOMETER DETECTION CIRCUIT

BACKGROUND OF THE INVENTION

This invention relates to the field of automobile alternator systems and, more particularly, to a protection circuit as for the tachometer of a diesel-powered vehicle.

In some systems, an output is taken from one or more phases of the alternator winding and supplied to various devices which operate from an AC output signal. The tachometer is one of the more important of these, and requires an AC signal with a significant amplitude in order to provide an accurate readout of engine speed. There are certain unusual circumstances, however, which can reduce the alternator output to a level which is unusable by the tachometer circuit. For example, if the battery of the automobile is fully or nearly charged, and the load goes from very light to very heavy, e.g., by turning on the headlights, the excitation will be increased in response to the current drain. If, at that point, the load is removed, there will be a considerable amount of energy stored in the alternator rotor. If the vehicle is a spark ignition engine, the ignition circuit will drain off this excess energy without any problem. However, if the engine is a diesel (with compression ignition), there is no equivalent means for dissipating this energy. The system, therefore, must attempt to store the energy in the battery, while the regulator will immediately reduce the field excitation to a minimum. This causes no problem within most automotive circuitry since the battery will be supplying all needed DC power. However, any circuit using the phase or AC output (such as the tachometer circuit) will be in trouble due to the sharply reduced alternator output. Since this problem is both infrequent and short-lived, it would be preferable to prevent the loss of excitation current under these circumstances, even at the expense of slight battery overcharge.

It would be advantageous if this prevention capability could be added to an existing circuit which examines the system and detects other "fault" conditions in the ignition system.

In a co-pending application, U.S. Ser. No. 06/687,603, assigned to the assignee of the present invention, a multifunction fault detector for use with the ignition system of a vehicle was disclosed. The present invention is preferably used in conjunction with that fault detector circuit.

In certain automobile markets, it is desired to provide for the detection and indication of a number of possible alternator system faults by means of a single lamp. Such a system must have, not only reliability, but essentially error-free operation. That is, temporary conditions of overvoltage or undervoltage which are not due to a fault requiring service are to be ignored, and apparent lack of shaft rotation or the transient pulses which are normal to automobile ignition systems must not cause false indications.

There are three main fault conditions which the system is able to detect and indicate; "non-rotation of the alternator", "overvoltage" and "undervoltage", and for any true fault, a lamp will be lit with a single accompanying legend such as "CHECK ENGINE". It is apparent that the fault lamp should not be lit for the temporary load change as described above.

SUMMARY

It is, therefore, an object of the present invention to provide a simple means for preventing temporary loss of alternator excitation due to sudden and momentary loss of battery load.

It is another object to prevent the fault lamp from being illuminated under such temporary load conditions.

It is a particular object to provide this capability in conjunction with a multifunction/detector regulator with a minimum of added complexity and cost.

These objects and others which will become apparent are obtained in a circuit wherein detection of a temporary reduction in the phase output, which is not due to a fault in the system, can be utilized to enable a second regulation loop. This second loop acts to override the normal regulation control. The field excitation is thereby maintained during the brief overvoltage condition. The fault lamp is also prevented from giving a false indication.

DETAILED DESCRIPTION OF A PREFERRED EMBODIMENT

Since the circuit of the present invention will typically utilize and be used with the fault detection circuit of the above-referenced co-pending application, the latter circuit will be described in some detail. While that specific environment is not required, in the present application the present invention can utilize output signals already provided by that circuit, whereby the feature of the present invention can be realized at little added cost. It will be apparent that, if the present invention were used in a different environment, those same signals would have to be derived independently.

Figure 1:
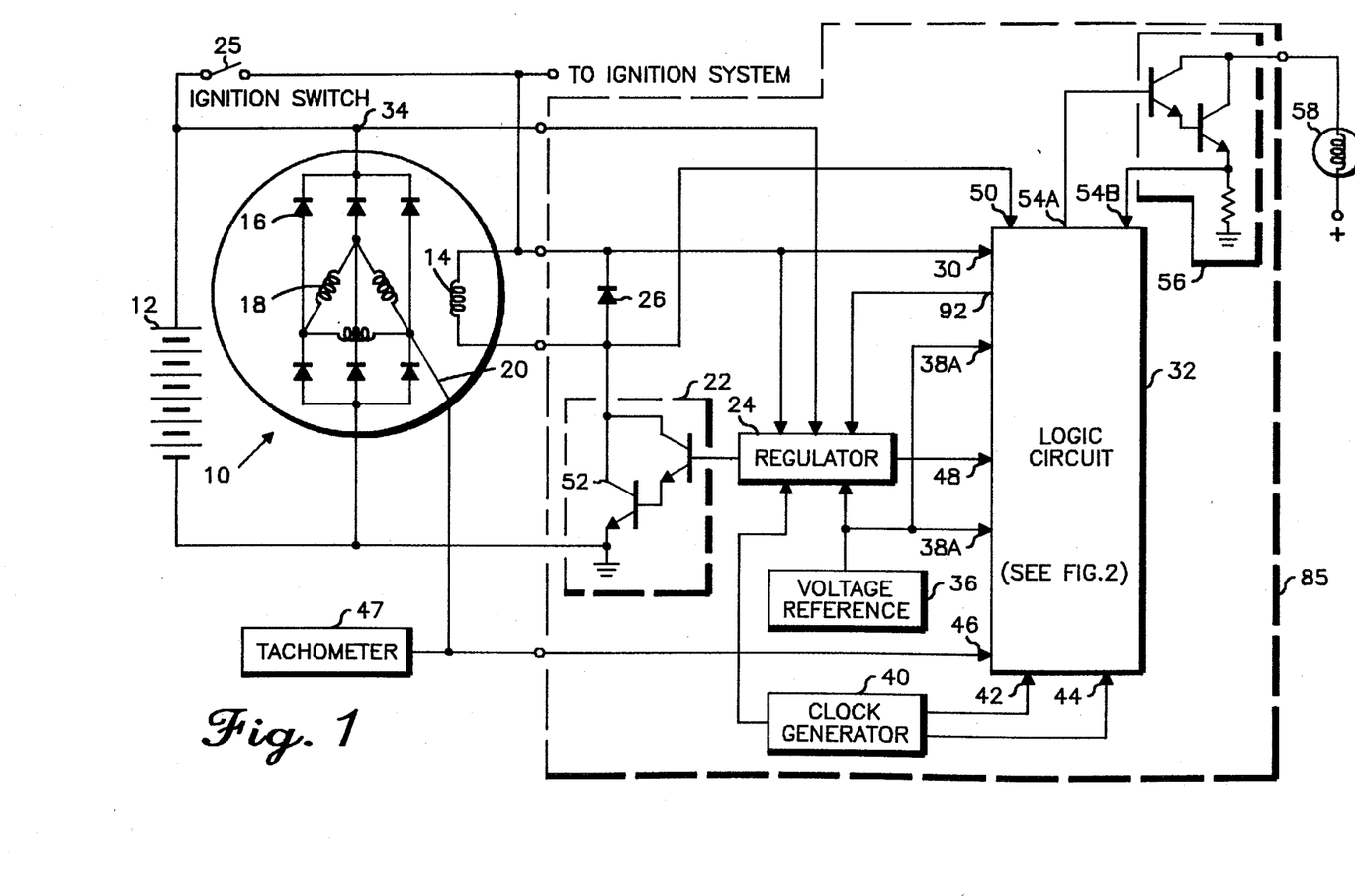
FIG. 1 is a diagram of an alternator system including the present invention.

In the diagram of FIG. 1, an alternator system is shown which includes an alternator 10, battery 12, field coil 14 and rectifiers 16. A tap 20 is connected to one corner of a winding 18 and provides an AC output signal which will be discussed later. A Darlington circuit 22 is the drive circuit for the field coil 14 and is controlled by the output of a standard regulator circuit 24. An ignition switch 25 may be connected to couple the alternator/battery output to the rest of the vehicle's electrical system (not shown).

The field coil 14 and its associated diode rectifier 26 are coupled to the regulator circuit 24 and to an "undervoltage" input terminal 30 of a logic circuit 32. The logic circuit is shown in and explained with respect to FIG. 2. Another input to the regulator circuit 24 comes from a point 34 on the alternator 10. The signal at this point is sometimes termed the alternator "sense" signal and is a composite of the rectifier 16 output and the battery 12 voltage. A voltage reference source 36 is coupled to the regulator circuit 24 and to three inputs 38A, 38B and 38C of the logic circuit 32. A clock generator 40 is coupled to the regulator 24 and to two inputs 42, 44 of the logic circuit 32. The tap 20 on the alternator winding 18 is coupled to an input 46 of the logic circuit.

The tap 20 is also a desirable connection point for a tachometer circuit 47. Since the tachometer provides a readout of engine speed, it requires a dependable AC input signal which is proportional to engine speed. This signal can be the AC signal from the alternator of the charging system unless the AC signal goes too low to be usable in the circuit while the engine is still running.

An output from the regulator 24 is coupled to an "overvoltage" input 48 of the logic circuit 32. Another input 50 to the logic circuit 32 comes from a terminal 52 on the collector of the Darlington drive circuit 22. Terminals 54A,54B from the logic circuit 32 are connected to a second Darlington circuit 56 which controls an indicator 58, typically a lamp.

Figure 2:
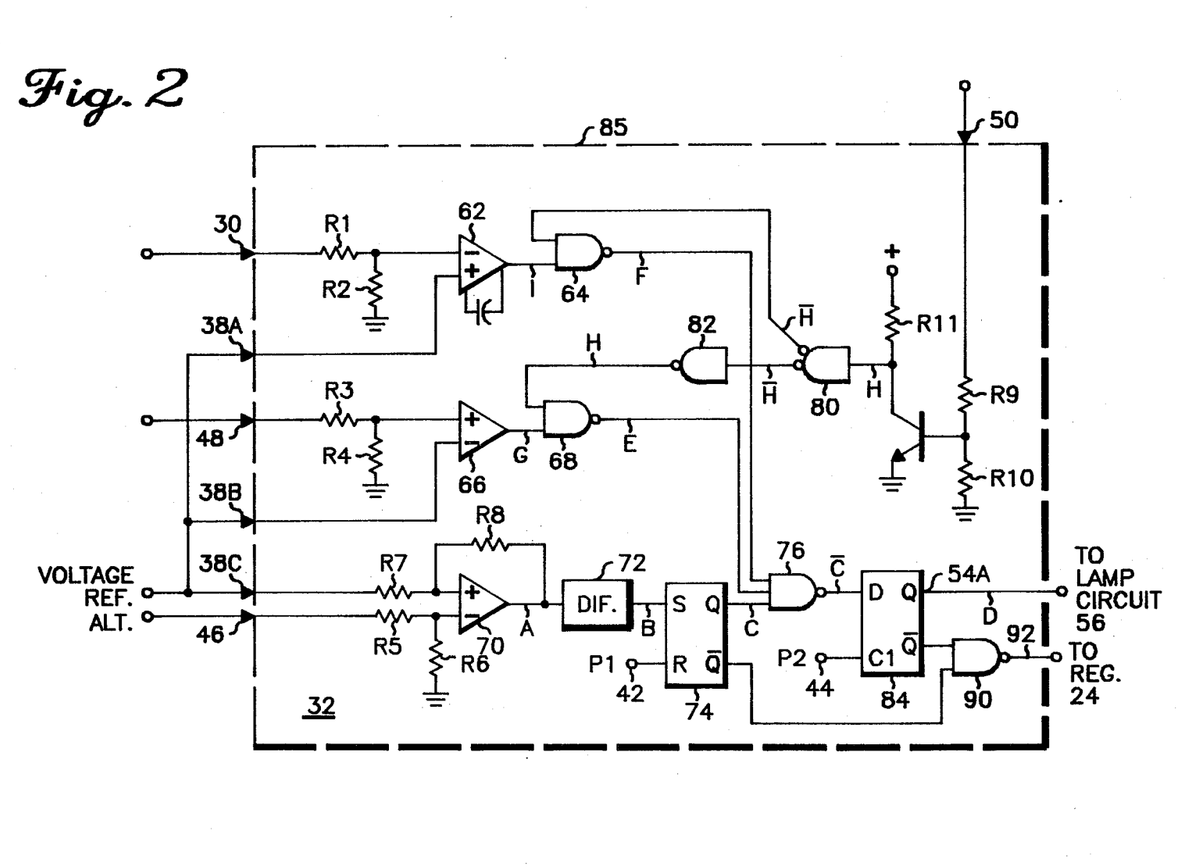
FIG. 2 is a logic diagram of one element of FIG. 1.

In FIG. 2, the logic circuit 32 is shown with the various input and output terminals numbered as in FIG. 1. The logic circuit was designed to be contained on an integrated circuit chip which, preferably, will include most of the regulator control circuitry. Thus, for example, few capacitors are required for this circuit. The "undervoltage" input terminal 30 is coupled through a resistor network R1, R2 to an "undervoltage" comparator 62. A second input to the comparator 62 comes from the reference terminal 38A, and the output of the comparator is coupled to a NAND gate 64. The "overvoltage" terminal 48 is coupled through a network R3, R4 to an "overvoltage" comparator 66. A second input to the comparator 66 comes from the reference terminal 38B, and the output of the comparator is coupled to a NAND gate 68. The tap 20 on the winding 18 is coupled to an input 46 of the logic circuit 32.

Terminal 46 is coupled through a resistor network R5,R6 to an input of a "rotation" comparator 70. A second input to the comparator comes from the reference terminal 38C, and the comparator output is coupled to a differentiator 72. The differentiator not only provides AC coupling, eliminating the possibility of error due to rectifier leakage, but also serves as a frequency doubler which may be necessary in some applications. The output of the differentiator is coupled to the "set" input of a flip-flop 74, and the terminal 42 feeds a clock pulse P1 to the "reset" input during each regulation period. The flip-flop 74 output is coupled to one input of a NAND gate 76. Second and third inputs to the NAND 76 come from the NAND gates 64 and 68, respectively.

The logic circuit input terminal 50, which comes from the collector terminal 52 of the Darlington drive circuit 22, is coupled through a resistor network R9,R10 to the base of a transistor T1, the collector of which is coupled to a NAND gate 80. The output of the NAND 80 is coupled to a second input of the NAND 64, and also to an input of a NAND gate 82. The output of NAND 82 is coupled to a second input of the NAND 68.

A flip-flop 84, which gets its data input from the output of the NAND 76, has its Q output coupled to the indicator control circuit 56. A clock pulse P2 from the clock generator is coupled by way of the terminal 44 to the clock input of the flip flop 84. The not-Q output of the NAND 84 is coupled to a NAND 90 which also receives an input from the not-Q output of the flip flop 74. The not-Q output of the flip flop 84 is coupled to an input of a NAND 90, the second input of which comes from the not-Q output of the flip flop 74. The output of the NAND 90 is coupled via point 92 to an input of the regulator 24. This last part of the circuit will be best understood with respect to the description of the timing diagram of FIG. 6.

Figure 3:
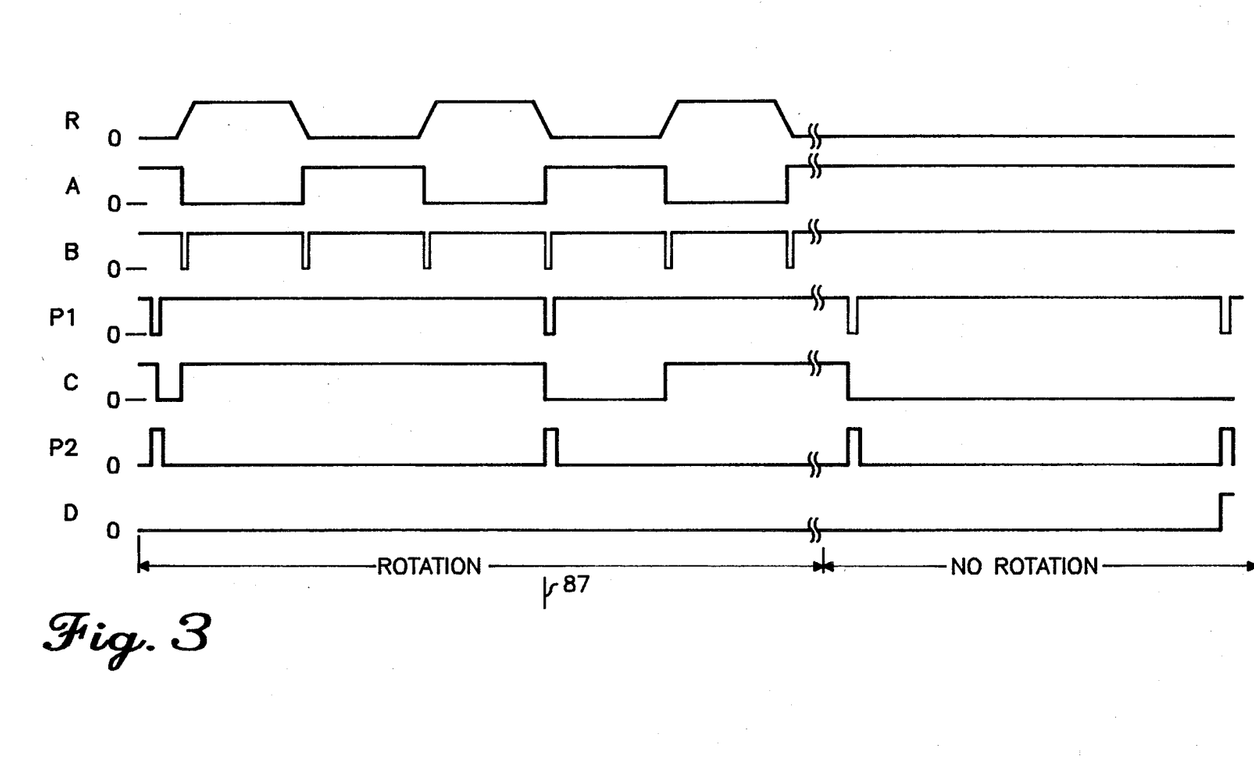
FIGS. 3-5 are timing diagrams of the main waveforms of the circuit of FIG. 2 in three operating modes.

The operation of the logic circuit 32 will be explained in connection with the waveform charts of FIGS. 3–5 which may be seen to relate to the detection of engine faults as mentioned above. The first portion of each chart shows an apparent "fault" condition, while the second part of the chart represents an actual fault. FIG. 3 is related to the detection of "rotation/non-rotation" which, in actuality, can mean any of the following:

(1) Ignition on, engine not started
(2) Fan belt broken
(3) Field coil open circuit or disconnected
(4) Field coil short circuit
(5) Disconnection of sense wire.

In the circuit of FIG. 2, a signal comes from the alternator winding 18 by way of a tap 20. This signal is represented by "R" in FIG. 3. This waveform will be something between a relatively pure sine wave (100% duty cycle) and a very clipped wave. The minimum duty cycle is never zero, even with maximum regulation. In order to avoid problems with DC voltage due to rectifier leakage, this signal is coupled through the comparator 70 which also has hysteresis for noise suppression. The output of the comparator 70 is the signal "A". This signal is coupled through the differentiator 72 which is made up of $I^2$logic gates and which provides a positive output pulse for each transition as seen in signal "B".

Whenever there is at least one pulse "B" during the regulated period, the flip flop 74 will be set, then reset by the subsequent pulse P1 as seen at a point 87 in FIG. 3. The output "C" of the flip flop 74 is then coupled through the NAND 76 and latched by the flip flop 84. Then, clocked by the next pulse P2 from terminal 44, the flip flop 84 output "D" is coupled to the lamp control circuit 56. In this portion, since "D" is zero, the lamp will not be lit, indicating that "rotation" is still present.

The second half of FIG. 3 shows the signals for a true "non-rotation" condition. When the signal "R" from the alternator goes low and stays low, the output "A" of the comparator 70 goes high and stays high, and the differentiated signal "B" goes high and stays high. With no pulse from the differentiator 72 to set the flip flop 74, the Q output signal "C" again goes low and, at the next pulse P2, the "D" signal is latched high, thus indicating "non-rotation".

Figure 4:
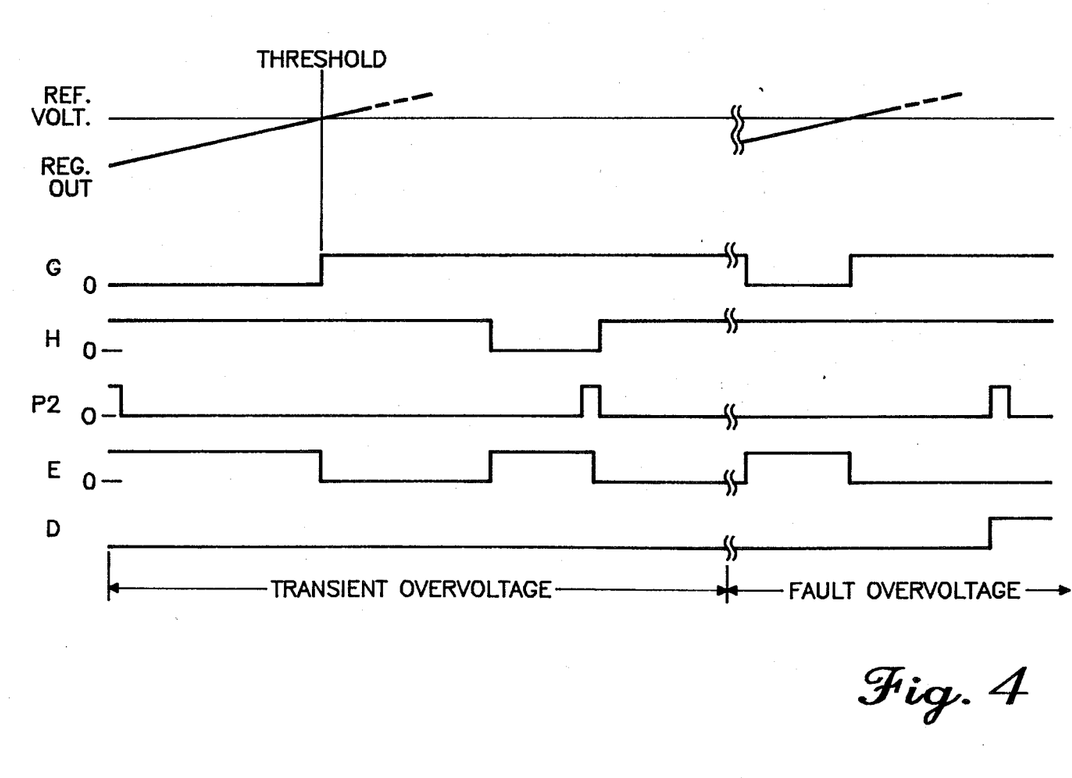

FIG. 4 shows the timing diagrams relating to the detection of an overvoltage condition. Here the problem is to distinguish between a transient voltage rise and a true overvoltage condition. A true fault could be caused by one of the following:

(1) Field coil shorted to ground
(2) Drive Darlington shorted to ground
(3) A fault in the regulator circuit.

A transient condition could be caused by a heavy load being removed while the battery was fully charged. In the case of a real fault, the signal "H" from the NAND 82 will be high, as will be explained later. Therefore, if any overvoltage is detected while signal "H" is high, a true fault condition is present.

In the case of a transient overvoltage condition, when the signal coming from the regulator output terminal 48 into the comparator 66 is higher than the threshold point of the reference voltage on terminal 38B, the output signal "G" of the comparator goes high. When signal "G" is NANDed with signal "H" in NAND gate 68, the result is signal "E". When signal "E" is coupled through the inverting gate, NAND 76, to the data input of the flip flop 84, the Q output signal "D" stays low when clocked by the signal P2, indicating "no fault".

In the second part of FIG. 4, again the regulator output signal rises until it passes the threshold of the reference voltage, and the signal "G" goes high. In this instance, however, the signal "H" is also high since a true fault of some sort exists. The resultant NANDed signal "E" goes low and stays low. When "E" is inverted by NAND 76 and coupled to the data input of the flip flop 84, the flip flop output signal "D" goes high at the clock pulse P2, accurately indicating a fault condition.

Returning now to the signal "H" and the circuit including NAND gates 80, 82, and transistor T1, the signal received at the terminal 50 is representative of the status of the Darlington driver circuit 22. Since, in each of the true overvoltage conditions, the Darlington collector voltage will be continuously low, the input voltage at the terminal 50 will be low. In the event of a transient overvoltage, the Darlington collector voltage will be high since the circuit will be off at the end of the regulate period. This is proper because the regulator will be working correctly to reduce the output voltage.

Figure 5:
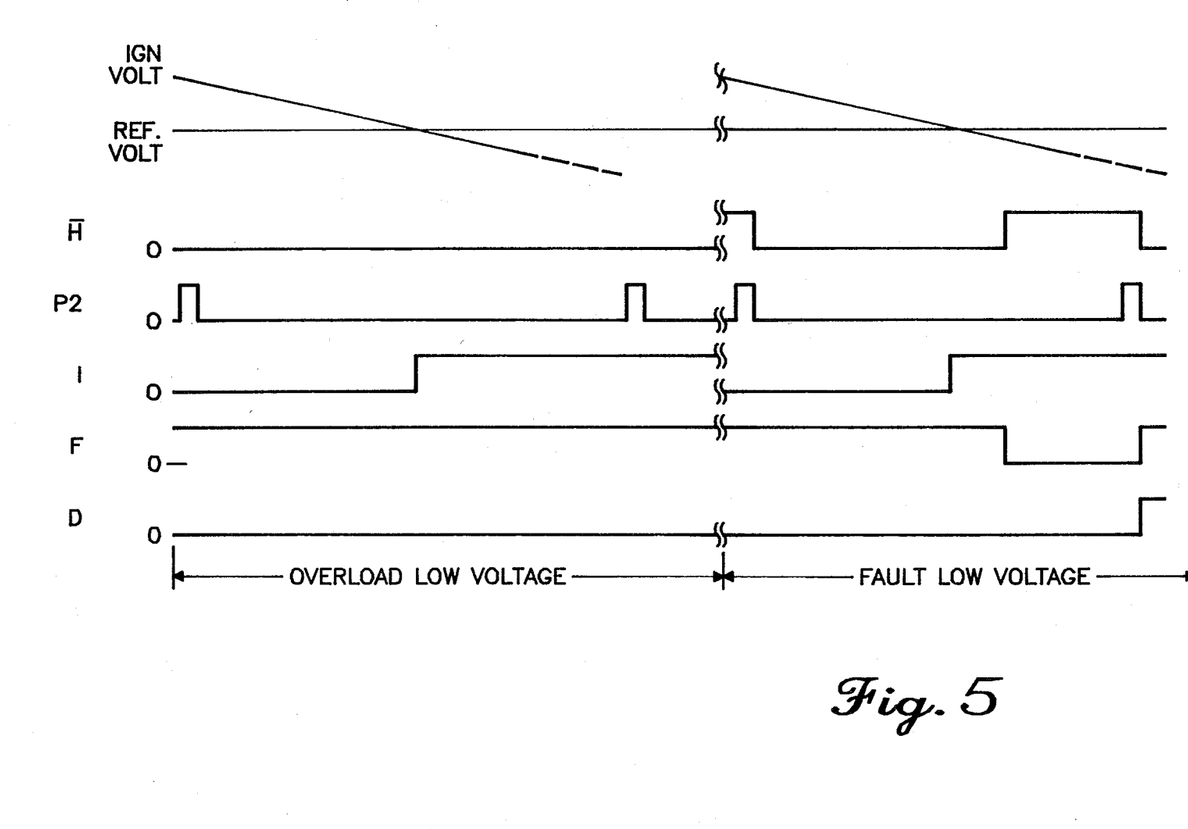

In FIG. 5, "undervoltage" conditions are shown; the first part showing a low voltage caused by an overload condition, and the second part showing low voltage caused by a true fault. The latter condition would likely be the result of an open circuit in the alternator-battery connection. If the regulator output voltage drops below the reference voltage at the comparator 62 input, the comparator output signal "I" would go high. When signal "I" is NANDed with the inverse of signal "H" in NAND 64, the resultant output signal is the signal "F". Since the not-H signal stays low in the case of a transient overvoltage, due to the fact that the Darlington drive circuit is "on" and the system is operating at full capacity, the signal "F" stays high. The "D" signal also stays low, indicating "no fault" and the lamp 58 is not lit.

In the second part of FIG. 5, again the regulator output voltage drops but, in this instance, due to a true fault. Now, when the threshold is crossed and signal "I" goes high, the not-H signal is also high and the output "F" of the NAND 64 goes low. The signal "F", coupled through the NAND 76 to the flip flop 84, will cause the output signal "D" of the flip flop to go high, enabling the indicator circuit 56 and lighting the "fault" lamp 58.

Figure 6:
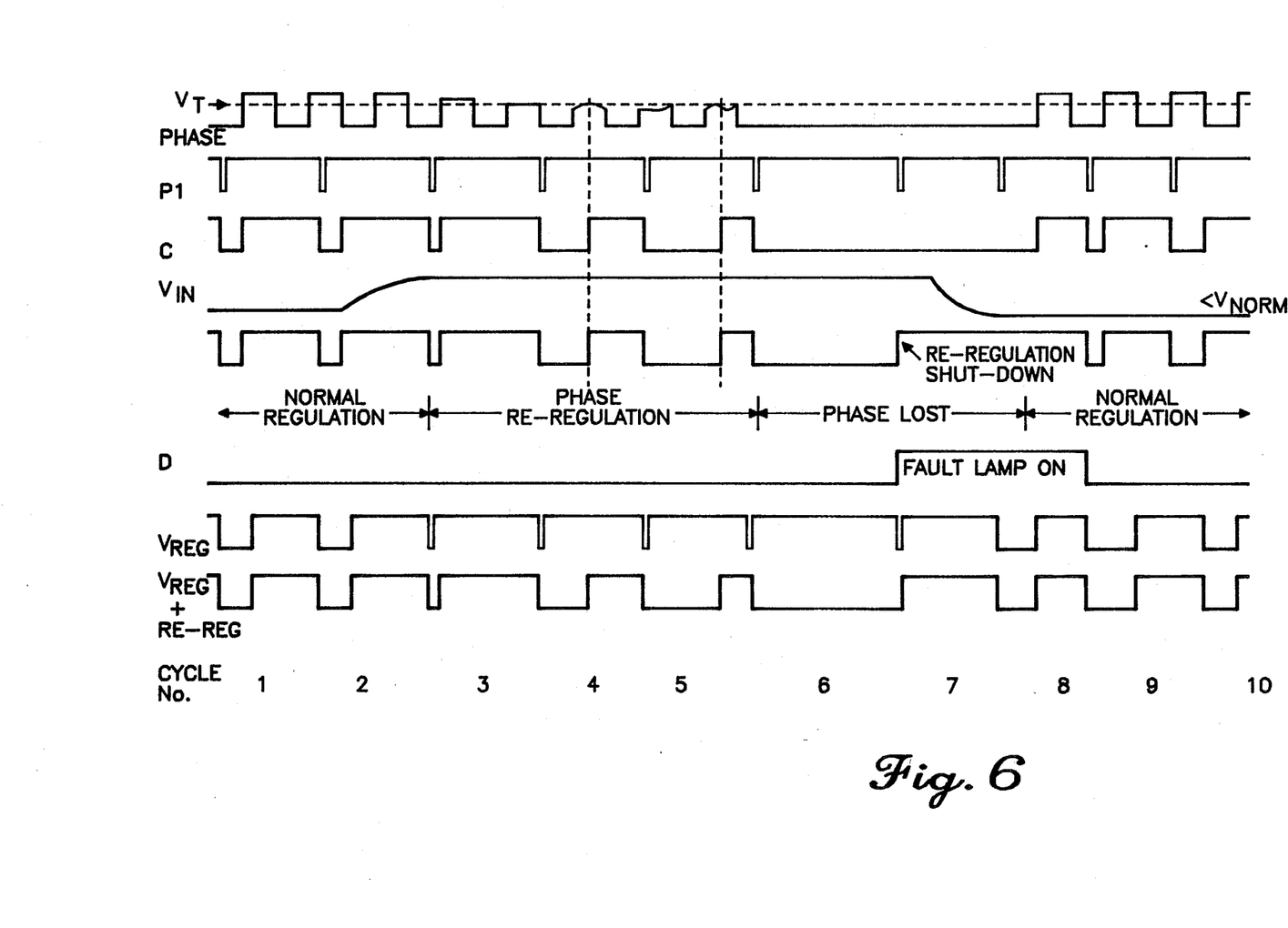
FIG. 6 is a timing diagram for the circuit of the invention.

Against the background of the above-described system and the signals it derives, the operation of the re-regulation circuit will be described in more detail with respect to the timing diagram of FIG. 6. The first portion of FIG. 6 illustrates the normal regulation mode of the system. The "phase" or AC input signal from the tap 20 of the alternator 10 via the terminal 46 may be a square wave as shown here for simplicity in the drawing, a sine wave, or a clipped sine wave. The threshold or reference voltage "$V_T$" is shown also, with a typical value of 8-10 V in this application. P1 is the clock pulse for the flip flop 74 as described above. Waveform "C" is the Q output of the flip flop 74. Signal "$V_{IN}$" is the regulator 24 input voltage from point 34 on the alternator rectifiers. The waveform "K" is the output of the NAND gate 90, and is the re-regulation control voltage. The waveform "D" is, as described with respect to FIG. 3, the Q output of the flip flop 84. "$V_{REG}$" is the normal regulation voltage provided by the regulator 24. The final line of the chart is the sum of the two regulation control signals, $V_{REG}+K$ which actually controls the Darlington driver circuit 22.

During cycle 1, the whole alternator/charging system is working normally. During cycle 2, an overvoltage condition has begun, due to some sudden decrease in load while the battery is nearly or fully charged. This rise in "$V_{IN}$" causes the regulation signal "$V_{REG}$" to go to a minimum duty cycle (cycles 3-7). If there were no re-regulation circuit present, the phase signal would continue to decay in amplitude in order to reduce the "overvoltage" condition until it would no longer be large enough to cross the threshold $V_T$ and would soon be too low to activate the tachometer circuit.

The output of the flip flop 74 provides an indication that there is present a signal of sufficient amplitude to trigger the comparator 70 and the differentiator 72. Thus the flip flop 74 output "C" can be used to override the normal regulation signal "G" as may be seen in the second portion of FIG. 6 (cycles 3-5). It is to be noted here that, in normal regulation, the normal duty cycle signal is a longer pulse than the output of the flip flop 74, so the flip flop signal is overridden. When, however, the duty cycle is reduced due to a transient overvoltage, the flip flop 74 pulse is now the longer pulse, so it controls the regulation. It should be mentioned here that the re-regulation function may not be performed with all of the precision required of the normal regulation function, but it is quite adequate to maintain tachometer accuracy during the brief and infrequent overload conditions described herein.

The re-regulation operation as described so far would be quite satisfactory as long as no real fault exists. If, however, the "phase" connection from tap 20 became disconnected, the circuit could cause a problem since the re-regulation circuit would attempt to control the regulator 24, resulting in a potentially serious overvoltage condition. This eventuality has been taken care of by further circuitry. The actual fault situation is illustrated in cycles 6-7 of FIG. 6. The not-Q output of the flip flop 84 (indicating a true fault in the system) will shut down the re-regulation circuit after only one cycle of overload, and the "fault" lamp will be illuminated by the lamp circuit 56. As seen in cycle 8, when the transient overvoltage decays, normal regulation function returns. The reregulation circuit is thus seen to be "fail-safe" and cannot generate an overvoltage due to an externally caused, apparent "fault".

Thus, there has been shown and described a circuit for preventing inaccuracy in or disablement of the tachometer circuit of a vehicle due to a temporary overvoltage condition. The fault indicator is also prevented from being activated under the temporary conditions. The circuit works in conjunction with a multi-function fault detector circuit whereby the temporary overvoltage condition can override the normal regulation control signal as long as no actual fault appears. The entire circuit is particularly adaptable to embodiment on an integrated circuit chip, due to its simplicity and almost total lack of capacitors. Other variations and modifications are possible within the spirit of the invention and it is intended to cover all such as fall within the scope of the appended claims.

I claim:

1. A re-regulation circuit as for use with a vehicle alternator/charging system and comprising:

regulator means for producing a first control signal for controlling the excitation current of said alternator;

first detection means coupled to said alternator/charging system for detecting that the output of said alternator is lower than a predetermined level;

first logic means coupled to the first detection means for providing a second control signal in response to said detection for controlling the excitation current of said alternator;

fault detection means coupled to said alternator/charging system for providing a fault signal in response to detection of an actual fault in said system;

second logic means coupled to the first logic means and the fault detection means for disenabling said second control signal in response to said fault signal; and means coupling said second control signal to the regulator whereby the second control signal is combined with the first control signal.

2. A re-regulation circuit in accordance with claim 1 and wherein the first detection means includes a reference voltage source and comparator means for comparing said alternator output with the reference voltage.

3. A re-regulation circuit in accordance with claim 2 and wherein the first detection means further includes a differentiating means coupled to the output of said comparator means.

4. A re-regulation circuit in accordance with claim 1 and wherein the first logic means includes a latching circuit and a clock signal input for clocking said latching circuit.

5. A re-regulation circuit in accordance with claim 1 and wherein the fault detection means includes means for detecting at least one apparent fault in said system and providing an apparent-fault signal.

6. A re-regulation circuit in accordance with claim 5 and wherein the fault detection means further includes logic means for combining the fault signal and the apparent-fault signal.

7. A re-regulation circuit in accordance with claim 1 and wherein the second logic means includes a second latching circuit and a clock signal input for clocking said latching circuit.

8. A re-regulation circuit in accordance with claim 7 and wherein the second logic means further includes a gating means coupled to the outputs of the first and second logic means.

9. A re-regulation circuit in accordance with claim 1 and further including an indicator means coupled to the second logic means for indicating the presence of an actual fault in the system.

* * * * *